United States Patent
Pelenc et al.

(10) Patent No.: US 11,181,424 B2
(45) Date of Patent: Nov. 23, 2021

(54) PROCESS FOR MANUFACTURING A MICROBOLOMETER CONTAINING VANADIUM OXIDE-BASED SENSITIVE MATERIAL

(71) Applicant: COMMISSARIAT A L'ENERGIE ATOMIQUE ET AUX ENERGIES ALTERNATIVES, Paris (FR)

(72) Inventors: Denis Pelenc, Grenoble (FR); Xavier Zucchi, Grenoble (FR); Claire Vialle, Grenoble (FR); Valerie Goudon, Grenoble (FR); Abdelkader Aliane, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/969,453

(22) PCT Filed: Feb. 14, 2019

(86) PCT No.: PCT/FR2019/050326
§ 371 (c)(1),
(2) Date: Aug. 12, 2020

(87) PCT Pub. No.: WO2019/158863
PCT Pub. Date: Aug. 22, 2019

(65) Prior Publication Data
US 2021/0010868 A1 Jan. 14, 2021

(30) Foreign Application Priority Data
Feb. 15, 2018 (FR) ...................... 18 00145

(51) Int. Cl.
*G01J 5/02* (2006.01)
*G01J 5/04* (2006.01)
*G01J 5/20* (2006.01)

(52) U.S. Cl.
CPC ............... *G01J 5/024* (2013.01); *G01J 5/046* (2013.01); *G01J 5/20* (2013.01)

(58) Field of Classification Search
CPC .............. G01J 5/024; G01J 5/046; G01J 5/20
See application file for complete search history.

(56) References Cited

U.S. PATENT DOCUMENTS 5,805,049 A 9/1998 Yamada et al.
6,127,914 A 10/2000 Sasaki
(Continued)

FOREIGN PATENT DOCUMENTS

EP 1 243 903 A2 9/2002
JP 11-271145 A 10/1999
(Continued)

OTHER PUBLICATIONS

Venkatasubramanian, C. et al., "Correlation of temperature response and structure of annealed $VO_x$ thin films for IR detector applications," Journal of Vacuum Science and Technology: Part A. AVS/AIP, vol. 27, No. 4, Jun. 30, 2009, pp. 956-961.
(Continued)

*Primary Examiner* — Christine S. Kim
(74) *Attorney, Agent, or Firm* — Oblon, McClelland, Maier & Neustadt, L.L.P.

(57) ABSTRACT

A process for manufacturing at least one microbolometer comprising a sensitive material based on vanadium oxide containing nitrogen as additional chemical element, includes steps of determining a non-zero effective amount of the additional chemical element starting from which the sensitive material, having undergone a step of exposure to a
(Continued)

temperature $T_r$ for a duration $\Delta t_r$, has an electrical resistivity $\rho_{a|r}$ at ambient temperature greater than or equal to 50% of the native value $\rho_a$ of said sensitive material at ambient temperature; producing the sensitive material in a thin layer having an amount of the additional chemical element greater than or equal to the effective amount determined beforehand, the sensitive material being amorphous and having an electrical resistivity of between 1 and 30 $\Omega\cdot$cm; and exposing the sensitive material to a temperature $T_r$ for a duration $\Delta t_r$.

12 Claims, 4 Drawing Sheets

(56) References Cited

U.S. PATENT DOCUMENTS

| | | | |
|---|---|---|---|
| 6,413,385 | B1 | 7/2002 | Sasaki |
| 8,329,002 | B1 | 12/2012 | Githinji et al. |
| 2010/0243896 | A1* | 9/2010 | Geneczko ............... G01J 5/023 |
| | | | 250/338.1 |
| 2011/0303847 | A1* | 12/2011 | Kurashina ............... G01J 5/023 |
| | | | 250/338.4 |
| 2016/0273968 | A1* | 9/2016 | Novotny ............. B81C 1/00285 |
| 2017/0137281 | A1 | 5/2017 | Favier et al. |
| 2018/0021561 | A1 | 8/2018 | Favier et al. |

FOREIGN PATENT DOCUMENTS

| | | |
|---|---|---|
| WO | WO 2012/122619 A1 | 9/2012 |
| WO | WO 2016/009126 A1 | 1/2016 |

OTHER PUBLICATIONS

Cole, B. E. et al., "Integrated vacuum packaging for low-cost lightweight uncooled microbolometer arrays," Proceedings of SPIE, vol. 4369, Oct. 10, 2001, total pages: 6.

Garcia-Blanco, S. et al., "Hybrid wafer-level vacuum hermetic micropackaging technology for MOEMS-MEMS," Proceedings of SPIE, vol. 7206, 2009, total pages: 11.

International Search Report dated Jul. 10, 2019 in PCT/FR2019/050326 filed on Feb. 14, 2019, 3 pages.

\* cited by examiner

PROCESS FOR MANUFACTURING A MICROBOLOMETER CONTAINING VANADIUM OXIDE-BASED SENSITIVE MATERIAL

TECHNICAL FIELD

The field of the invention is that of devices for detecting electromagnetic radiation, for example infrared or terahertz electromagnetic radiation, comprising at least one resistive thermal detector comprising a sensitive material based on vanadium oxide. The invention is applicable notably to the field of infrared imaging and thermography.

This invention is the result of a contract concluded with the French Ministry of Defense, which possesses certain rights thereto.

PRIOR ART

An electromagnetic radiation detection device may comprise an array of resistive thermal detectors, also called microbolometers, each microbolometer comprising an absorbent portion capable of absorbing the electromagnetic radiation to be detected.

In order to thermally insulate the sensitive material of the microbolometers, the absorbent portions are usually in the form of membranes suspended above the substrate by anchoring pillars, and are thermally insulated therefrom by holding and thermal insulation arms. These anchoring pillars and thermal insulation arms also have an electrical function by electrically connecting the suspended membranes to a readout circuit that is generally arranged in the substrate.

The absorbent membrane comprises a sensitive material whose electrical resistivity p varies as a function of the temperature of the material. The sensitive material is characterized by the value $\rho_a$ of the electrical resistivity at ambient temperature and by its coefficient $\alpha$ (or TCR), which is defined by the relationship $\alpha=1/\rho \times d\rho/dT$. The sensitive material may be a semiconductor material usually chosen from among amorphous silicon and a vanadium oxide $VO_x$.

The choice of the sensitive material depends notably on its compatibility with the conventional deposition and etching steps usually used in microelectronics, and notably in silicon technology. However, it appears that a sensitive material based on vanadium oxide is likely to have its electrical properties degraded following the microbolometer manufacturing process.

DISCLOSURE OF THE INVENTION

The aim of the invention is to at least partly remedy the drawbacks of the prior art, and more particularly to propose a process for manufacturing at least one microbolometer comprising a sensitive material based on vanadium oxide whose electrical properties are preserved, and more precisely whose risks of 1/f noise degradation of the sensitive material, following the manufacturing process, are limited or even eliminated.

To this end, the subject of the invention is a process for manufacturing at least one microbolometer comprising a sensitive material for at least limiting noise degradation of said sensitive material, said sensitive material being formed of a first compound based on vanadium oxide and at least nitrogen as additional chemical element, the process comprising the following steps:

a step of producing the sensitive material in a thin layer;

a step of exposing the sensitive material to a temperature $T_r$ greater than the ambient temperature, for a duration $\Delta t_r$, this thermal exposure step being performed after the step of producing the sensitive material, the temperature $T_r$ and the duration $\Delta t_r$ being such that said first compound, being amorphous and having a native electrical resistivity value at ambient temperature of between 1 $\Omega \cdot$cm and 30 $\Omega \cdot$cm, having undergone a step of exposure to the temperature $T_r$ for the duration $\Delta t_r$, has an electrical resistivity at ambient temperature less than 50% of its native value;

the process furthermore comprising the following steps:

i. determining a non-zero what is called effective amount of the additional chemical element added to said first compound, thus forming a modified compound, starting from which the modified compound, having undergone a step of exposure to the temperature $T_r$ for the duration $\Delta t_r$, has an electrical resistivity $\rho_{a|r}$ at ambient temperature greater than or equal to 50% of the native value $\rho_a$ of said sensitive material at ambient temperature;

ii. in said step of producing the sensitive material in a thin layer, the latter is formed of said modified compound having an amount of the additional chemical element greater than or equal to the effective amount determined beforehand, the sensitive material being amorphous, having a native electrical resistivity value $\rho_a$ at ambient temperature of between 1 $\Omega \cdot$cm and 30 $\Omega \cdot$cm, and a homogeneous chemical composition;

iii. such that, following said step of exposing the sensitive material to the temperature $T_r$ for the duration $\Delta t_r$, said sensitive material (15) then has a noise whose degradation has been at least limited.

Certain preferred but non-limiting aspects of this manufacturing process are as follows.

The manufacturing process may comprise a preliminary step of determining the native value $\rho_a$ of the electrical resistivity at ambient temperature of the sensitive material containing the non-zero amount under consideration of the additional chemical element. It may also comprise a preliminary step of determining the native value of the electrical resistivity at ambient temperature of the first compound.

The step of exposing the sensitive material may comprise a step of depositing a protective layer covering the sensitive material.

The step of exposing the sensitive material may comprise a step of depositing an encapsulation layer transparent to the electromagnetic radiation to be detected and intended to define a cavity in which the microbolometer is located.

The temperature $T_r$ may be greater than or equal to 280° C., or even equal to 310° C. to within 5° C.

The duration $\Delta t_r$ may be greater than or equal to 90 min.

The sensitive material may be produced at a temperature less than the temperature $T_r$, for example at ambient temperature.

The invention also relates to a microbolometer comprising a sensitive material made of a first compound based on vanadium oxide and at least nitrogen as additional chemical element. The sensitive material:

is amorphous, has an electrical resistivity at ambient temperature of between 1 $\Omega \cdot$cm and 30 $\Omega \cdot$cm, a homogeneous chemical composition, and an amount of nitrogen, defined as the ratio of the number of nitrogen atoms to that of vanadium, at least equal to 0.070.

The amount of oxygen, defined as the ratio of the number of oxygen atoms to that of vanadium, is preferably between 1.42 and 1.94, to within plus or minus 0.05. Moreover, the electrical resistivity at ambient temperature of the sensitive material may be between 2 Ω·cm and 30 Ω·cm, and its amount of oxygen may then be between 1.56 and 1.94, to within 0.05. The amount of nitrogen may then be at least equal to 0.073.

The sensitive material may be covered by a protective layer of silicon nitride.

The invention also relates to a device for detecting electromagnetic radiation, comprising an array of microbolometers according to any one of the above features.

The microbolometers may be arranged in at least one hermetic cavity delimited by an encapsulation structure transparent to the electromagnetic radiation to be detected, the encapsulation structure comprising at least one layer made of amorphous silicon.

The detection device may comprise a getter material located in the hermetic cavity.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DISCLOSURE OF PARTICULAR EMBODIMENTS

In the figures and in the remainder of the description, the same references represent identical or similar elements. In addition, the various elements are not shown to scale so as to improve the clarity of the figures. Moreover, the various embodiments and variants are not mutually exclusive and may be combined with one another. Unless indicated otherwise, the terms "substantially", "approximately", "of the order of" mean to within 10%, and preferably to within 5%, and, with regard to temperatures, to within 10° C. and preferably to within 5° C. Moreover, the expression "comprising a" should be understood to mean "comprising at least one", unless indicated otherwise.

The indications relating to the chemical composition of a compound are expressed by its empirical chemical formula, conventionally expressed with respect to one (1) vanadium atom. Thus, for a compound $VO_xB_y$, mentioned here purely by way of illustration, the value x of the amount of oxygen is the number of oxygen atoms per 1 vanadium atom, and the value y of the amount of boron is the number of boron atoms per 1 vanadium atom. The value of the amount of the chemical element is given to within 10%. Moreover, the atomic percentage of each chemical element in the compound $VO_xB_y$ is $1/(1+x+y)$ for vanadium, $x/(1+x+y)$ for oxygen, and $y/(1+x+y)$ for boron.

The invention relates notably to a process for manufacturing at least one resistive thermal detector, also called a microbolometer, comprising a sensitive material based on vanadium oxide VON. The microbolometer may be designed to detect infrared or terahertz radiation. The sensitive material comprises a sufficient non-zero amount of at least one additional chemical element, here nitrogen and possibly, in addition to nitrogen, boron B and/or carbon C. In addition, the manufacturing process implements at least one step in which the sensitive material is exposed to a temperature greater than the ambient temperature and less than or equal to the temperature $T_r$, for a duration less than or equal to $\Delta t_r$, for example to 300° C. for 10 min, 30 min, or even 90 min or more. The thermal exposure temperature $T_r$ is therefore higher than the ambient temperature.

This thermal exposure step may correspond to the deposition, at approximately 300° C., of a protective layer, for example made of a silicon nitride SiN or a silicon oxide SiO, covering the sensitive material in order to protect it from any subsequent contamination by chemical elements that are possibly present. It may also correspond to producing an encapsulation layer of amorphous silicon, said layer being intended to define a hermetic cavity in which the microbolometer is located. It may also involve activating, at approximately 300° C., a getter material located in the hermetic cavity, this getter material being intended to react with residual gas possibly present in the cavity in order to keep same at a sufficient vacuum level.

These examples are given by way of illustration. The step of thermal exposure to the temperature $T_r$ for the duration $\Delta t_r$ may generally be implemented within the framework of technological steps for manufacturing the microbolometer that are performed after the sensitive material has been produced, or even within the framework of technological steps for manufacturing the detection device after the microbolometer or microbolometers have been produced, in particular in order to integrate additional functionalities in the detection chip.

Figure 1A:
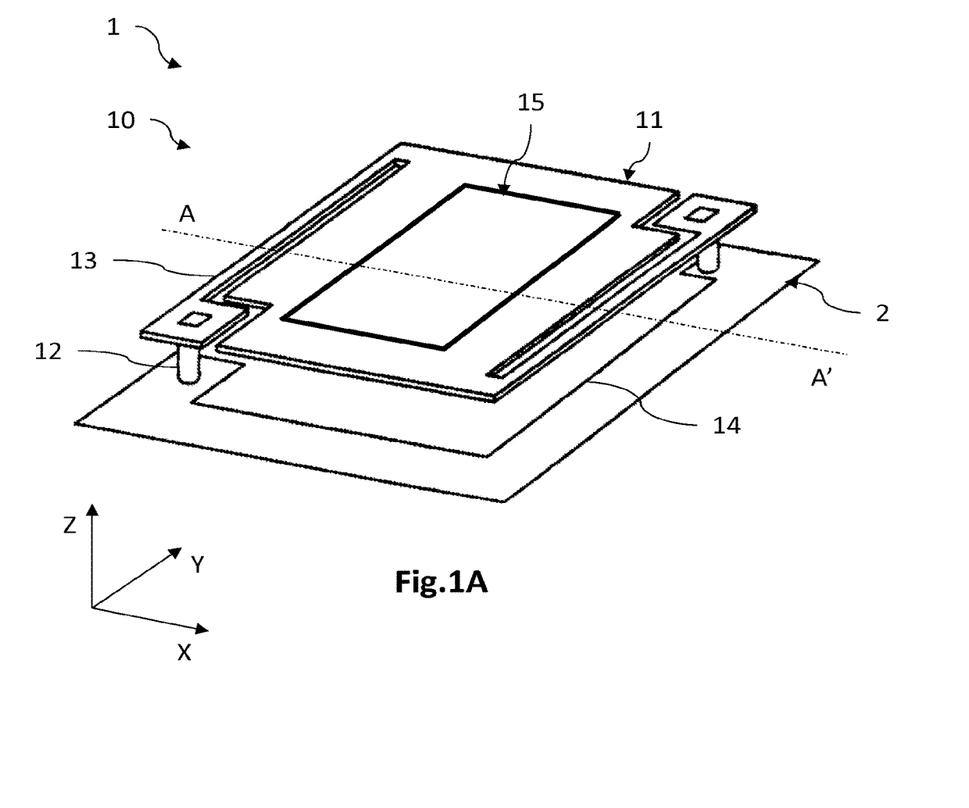
FIGS. 1A and 1B are schematic and partial views, respectively in perspective and in section along the plane A-A, of a microbolometer according to one embodiment, comprising a sensitive material based on vanadium oxide.
Figure 1B:
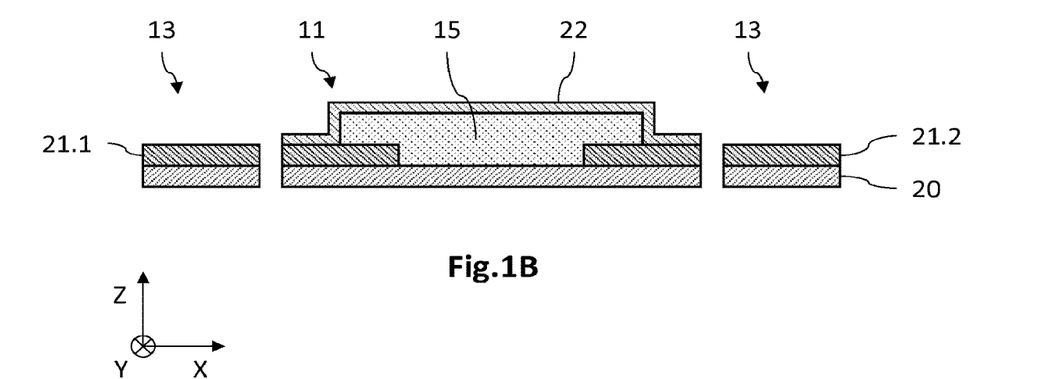

FIGS. 1A and 1B are schematic and partial views, respectively in perspective and in section along the plane A-A, of a microbolometer 10 of a device 1 for detecting electromagnetic radiation, the microbolometer 10 comprising a sensitive material 15 based on vanadium oxide $VO_x$.

The microbolometer 10 comprises an absorbent membrane 11 containing sensitive material $1_5$ based on vanadium oxide $VO_x$, suspended above a substrate 2 by anchoring pillars 12 and thermal insulation arms 13, as well as an electronic control and readout circuit (not shown) located in the substrate 2. The microbolometer 10 is designed here to absorb infrared radiation contained within the long wavelength infrared (called LWIR) band, ranging from approximately 8 µm to 14 µm.

Here and for the remainder of the description, a direct three-dimensional orthogonal reference system (X, Y, Z) is defined, where the plane XY is substantially parallel to the plane of a substrate 2, the Z-axis being oriented in a direction substantially orthogonal to the plane of the substrate 2. Moreover, the terms "lower" and "upper" are understood to relate to an increasing position when moving away from the substrate 2 in the direction +Z.

The microbolometer 10 comprises a substrate 2 based in this example on silicon, comprising an electronic circuit (not shown) allowing the microbolometer to be controlled and read. The electronic circuit comprises portions of conductive lines, for example made of metal, separated from one another by a dielectric material, for example a silicon-based mineral material such as a silicon oxide SiO, a silicon nitride SiN, or alloys thereof. To this end, it may comprise active electronic elements, for example diodes, transistors, capacitors, resistors, etc., connected by electrical interconnections to the microbolometer 10, on the one hand, and to an interconnection pad (not shown), on the other hand, the latter being intended to electrically connect the detection device 1 to an external electronic device.

The upper face of the substrate 2 may be covered with a protective layer (not shown), notably when the absorbent membrane is produced on a mineral sacrificial layer, which is then eliminated through a chemical attack with an acid medium. It may cover or be covered by a reflective layer 14 arranged under the absorbent membrane 11. When it covers the reflective layer 14, it is made of a material that is at least partially transparent to the electromagnetic radiation to be detected. The protective layer has an etch stop function, and is designed to protect the substrate and the inter-metal dielectric layers, when they are made of a mineral material, against a chemical attack, for example a chemical attack with an HF (hydrofluoric acid) acid medium implemented subsequently in order to etch the mineral sacrificial layer used in the production of the absorbent membrane. This protective layer thus forms a hermetic and chemically inert layer. It is electrically insulating so as to avoid any short circuit between the metal line portions. It may thus be made of alumina $Al_2O_3$, or even of aluminium nitride or fluoride. It may have a thickness of between a few ten and a few hundred nanometers, for example of between 10 nm and 500 nm, preferably of between 10 nm and 30 nm.

The microbolometer 10 comprises an absorbent membrane 11 incorporating a sensitive material 15 based on vanadium oxide $VO_x$, suspended above the substrate 2 by anchoring pillars 12 and thermal insulation arms 13. The anchoring pillars 12 are electrically conductive, and locally pass through the protective layer in order to create electrical contact with the electronic circuit. The absorbent membrane 11 is spaced from the substrate 2, and in particular from the reflective layer 14, by a non-zero distance. This distance is preferably adjusted so as to form a quarter-wave cavity optimizing the absorption of the electromagnetic radiation to be detected by the suspended membrane 11.

As illustrated in FIG. 1B, the absorbent membrane 11 may comprise a lower support layer 20 made of an electrically insulating material on which there rest two electrodes 21.1, 21.2 that are distinct from one another and made for example of TiN, which exhibits good absorption of infrared radiation. A thin layer of sensitive material 15 rests on the support layer 20 and comes into contact with each of the two electrodes 21.1, 21.2. The sensitive material 15 is in this case covered with a protective layer 22, made for example of a silicon nitride SiN or a silicon oxide SiO, which makes it possible to avoid any subsequent contamination of the sensitive material 15. This example is given purely by way of illustration, and other arrangements of the electrodes and of the sensitive material are possible.

Moreover, the microbolometer 10 may be located in a hermetic cavity defined by an encapsulation structure (not shown), as described in particular in the publication by Dumont et al. entitled *Current progress on pixel level packaging for uncooled IRFPA*, SPIE Proceedings Vol. $8_{353}$ (2012). The encapsulation structure may be formed by a stack of various thin layers, such as an encapsulation layer for example made of amorphous silicon deposited by CVD or iPVD, covered with a sealing and anti-reflective layer, for example made from various sub-layers of germanium and zinc sulfide, deposited for example by EBPVD, IBS or the like. Such an encapsulation structure is described notably in patent application $EP_{3067675}$.

The sensitive material 15 is based on vanadium oxide $VO_x$, that is to say that it is formed of what is called a base compound made from a vanadium oxide $VO_x$ to which at least nitrogen N as additional chemical element, and possibly, in addition to nitrogen, boron B and/or carbon C has been added. An additional chemical element is a chemical element intentionally added to the base compound, that is to say the vanadium oxide. The sensitive material 15 is amorphous, that is to say that it contains substantially no crystalline phases. Moreover, it has an electrical resistivity of between 1 Ω·cm and 30 Ω·cm, which corresponds to an amount of oxygen x, defined as the ratio between the number of oxygen atoms and the number of vanadium atoms, of between 1.42 and 1.94 to within plus or minus 0.05. In addition, it has a homogeneous chemical composition, that is to say that its chemical composition as defined in an elementary volume of the order of 3 nm in diameter is invariant on a large scale (in at least 90%, 95% or even 99% of its volume).

The base compound is amorphous and is based on $VO_xX$, with x being between 1.42 and 1.94, to within plus or minus 0.05, and preferably being between 1.56 and 1.94, to within 0.05. It does not show a stoichiometric form. It is thus distinguished from stoichiometric compounds such as $VO_2$, $V_2O_5$, $V_3O_5$. As stated above, the compound with the empirical chemical formula $V_2O_5$ in this case has 5 oxygen atoms per 2 vanadium atoms (x=5/2), and the compound $V_3O_5$ has 5 oxygen atoms per 3 vanadium atoms (x=5/3). It will be noted here that the stoichiometric compound $V_3O_5$ is a compound that cannot be obtained under the usual production conditions for such a microbolometer $VO_x$ base compound (temperature usually less than the maximum thermal budget of the readout circuit located in the substrate 2, that is to say less than 400° C.). Therefore, the $VO_x$ sensitive material according to the invention may have an amount x equal to 1.67 without however corresponding to the stoichiometric form $V_3O_5$. Moreover, with regard to the $V_2O_3$ stoichiometric compound, there is virtually zero probability that such a base compound, that is to say that is amorphous and having an electrical resistivity of between approximately 1 Ω·cm and 30 Ω·cm, will be able to form a single $V_2O_3$ stoichiometric crystalline phase after annealing at the temperature $T_r$. Therefore, even for an amorphous base compound having an amount of oxygen of about 1.5, therefore to within 0.05, several stoichiometric crystalline phases that differ in terms of their amount of oxygen are therefore likely to be formed after annealing at $T_r$, including the $V_2O_3$ crystalline phase. Whatever the case, if the amount of oxygen of the amorphous base compound is between 1.56 and 1.94, to within 0.05, a single $V_2O_3$ stoichiometric crystalline phase cannot form after annealing at $T_r$. It will moreover be noted that, if the base compound or the sensitive material has an amount of oxygen x of between 1.56 and 1.94, to within 0.05, the native electrical resistivity is then between approximately 2 Ω·cm and 30 Ω·cm.

The sensitive material 15 then corresponds to a modified compound, that is to say that it corresponds to the base compound that has been modified by the addition of at least one additional chemical element, here nitrogen N and possibly, in addition to nitrogen, boron B and/or carbon C.

The amount of additional chemical element, specifically the number of nitrogen atoms and possibly, in addition to nitrogen, of boron and/or carbon atoms to that of vanadium, is chosen so as to give the sensitive material, which has been exposed to the temperature $T_r$ for the duration $\Delta t_r$, an electrical resistivity $\rho_{a|r}$ at ambient temperature at least equal to 50% of its native value $\rho_a$. At least equal is understood to mean greater or equal. The native value $\rho_a$ of the electrical resistivity is that of the sensitive material before it has been exposed to the temperature $T_r$ for $\Delta t_r$.

The values of the temperature $T_r$ and of the duration $\Delta t_r$ are such that the first compound based on $VO_x$ (without the additional chemical element) has an electrical resistivity at ambient temperature less than 50% of its native value. These are values of the temperature and the duration of the thermal exposure to which the sensitive material 15 will be subjected in the subsequent steps of manufacturing the microbolometer.

The amount of nitrogen and possibly of boron and/or carbon is then greater than or equal to what is called an effective value, or effective amount. The effective amount is the minimum non-zero amount of nitrogen and possibly of boron and/or carbon starting from which the sensitive material, having undergone a step of exposure to the temperature $T_r$ for the duration $\Delta t_r$, has an electrical resistivity $\rho_{a|r}$ at ambient temperature at least equal to 50% of the native value $\rho_a$ of said sensitive material at ambient temperature. The ambient temperature may be equal to 30° C. The temperature $T_r$ is greater than the ambient temperature, and is preferably greater than or equal to 280° C., and preferably greater than or equal to 300° C. It may be less than or equal to 400° C. The duration $\Delta t_r$ is preferably greater than or equal to a few minutes or tens of minutes, or even a few hours.

In other words, when the sensitive material, the amount of nitrogen and possibly of boron and/or carbon in which is greater than or equal to the effective amount, has not been exposed to the temperature $T_r$ for the duration $\Delta t_r$, its electrical resistivity at ambient temperature has the native value $\rho_a$. After thermal exposure to $T_r$ for $\Delta t_r$, the sensitive material then has an electrical resistivity $\rho_{a|r}$ at ambient temperature at least equal to 50% of the native value $\rho_a$.

The effective amount depends notably on the base compound under consideration, as well as on the chosen values of the temperature $T_r$ and of the duration $\Delta t_r$ of the thermal exposure. A person skilled in the art is able to determine the effective amount, that is to say the minimum amount of nitrogen and possibly of boron and/or carbon, to be added to the base compound so that the sensitive material has an electrical resistance $\rho_{a|r}$ at ambient temperature at least equal to 50% of the native value $\rho_a$. The effective amount may be chosen, if necessary, such that the value $\rho_{a|r}$ is greater than 50%, for example at least equal to 75%, or even at least equal to 90% of the native value $\rho_a$.

The electrical resistivity at ambient temperature of the sensitive material may be determined using a conventional four-point measurement technique, and the atomic composition of the sensitive material, and therefore the amount of the additional chemical element, may notably be determined by NRA (Nuclear Reaction Analysis), by RBS (Rutherford Backscattering Spectroscopy), by SIMS (Secondary Ion Mass Spectrometry), by XPS (X-ray Photoelectron Spectroscopy), using suitable standards.

It is known that the electrical resistivity at ambient temperature of a sensitive material consisting of vanadium oxide $VO_x$ may drop in value when it has been exposed to a temperature of 300° C. or 400° C., in particular under an inert atmosphere (under nitrogen), as described in the publication by Venkatasubramanian et al. entitled *Correlation of temperature response and structure of annealed $VO_x$ thin films for IR detector applications*, J. Vac. Sci. Technol. A 27(4), 2009, 956-961. Thus, a sensitive material consisting of vanadium oxide, and therefore without an additional chemical element such as nitrogen, boron and carbon, has an electrical resistivity $\rho_{a|r}$ at ambient temperature of the same order of magnitude as its native value $\rho_a$ after exposure to a temperature of the order of 200° C. under an inert atmosphere. However, the electrical resistivity $\rho_{a|r}$ drops by an order of magnitude, or even several orders of magnitude, when the sensitive material has been exposed to a temperature of 300° C. or 400° C. for 10 min or 30 min under an inert atmosphere.

However, the inventors have found that the addition of a sufficient amount of nitrogen to a sensitive material based on vanadium oxide, and possibly, in addition to nitrogen, of boron and/or carbon, surprisingly makes it possible to improve the thermal stability of the sensitive material during thermal exposure to high temperatures, for example of the order of 300° C. or even more, for several tens of minutes, and more precisely to limit or even eliminate possible 1/f noise degradation of the sensitive material following the thermal exposure step.

The sensitive material based on vanadium oxide, with the addition of a sufficient amount of nitrogen, and possibly of boron and/or carbon, then has an electrical resistivity $\rho_{a|r}$ at ambient temperature at least equal to 50% of the native value $\rho_a$. The sufficient amount is an amount greater than or equal to the determined effective amount. Such a sensitive material then does not exhibit significant degradation of its electrical properties, and notably of its electrical resistivity at ambient temperature and of its 1/f noise, following the microbolometer manufacturing process which includes at least one step of exposing the sensitive material to $T_r$ for $\Delta t_r$, and steps of depositing thin layers, of encapsulating the microbolometer in a hermetic cavity, or even of activating a getter material.

More precisely, it appears that exposing a compound based on $VO_x$, when it is amorphous and has a native electrical resistivity $\rho_a$ at ambient temperature of between 1 Ω·cm and 30 Ω·cm, to a temperature $T_r$ for a duration $\Delta t_r$ such that its electrical resistivity $\rho_{a|r}$ is at least less than 50% of its native value $\rho_a$, also causes a degradation of 1/f noise, without the TCR coefficient otherwise being affected. It is recalled that 1/f noise, also called flicker noise or low-frequency noise, stems in particular from fluctuations in the mobility and/or density of free carriers.

Moreover, an amorphous compound based on a vanadium oxide $VO_x$, for which the electrical resistivity is between 1 Ω·cm and 30 Ω·cm, is not likely to form a single stoichiometric crystalline phase, after annealing at $T_r$, under the usual conditions for producing such a $VO_x$ base compound of a microbolometer (temperature less than 400° C.). In such an electrical resistivity range, the base compound has an amount of oxygen x of the order of approximately 1.42 to 1.94. Approximately is understood to mean here that the absolute uncertainty is ±0.05. As indicated above, the electrical resistivity of the base compound may be between 2 Ω·cm and 30 Ω·cm, its amount of oxygen x then being between 1.56 and 1.94, to within 0.05.

The inventors have found that the evolution of the 1/f noise of such a base compound as a function of the thermal exposure temperature $T_r$ for a given duration $\Delta t_r$ is correlated with that of the electrical resistivity, but is not correlated with that of the TCR coefficient.

Figure 2A:
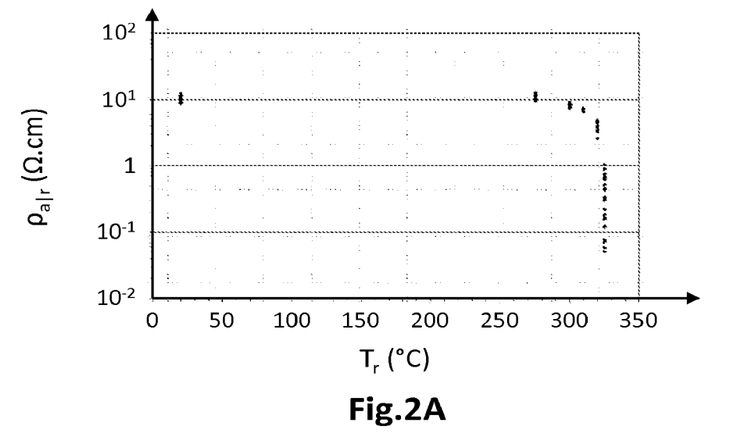
FIGS. 2A to 2C illustrate, respectively:
an example of the evolution of the electrical resistivity at ambient temperature of a base compound produced from vanadium oxide, not containing nitrogen, as a function of a thermal exposure temperature $T_r$;
an example of values of the TCR coefficient for $VO_x$ base compounds as a function of their electrical resistivity, without thermal exposure, and after thermal exposure to 310° C. for 90 min;
an example of values of a parameter representative of the 1/f noise for $VO_x$ base compounds as a function of their electrical resistivity, without thermal exposure, and after thermal exposure to 310° C. for 90 min.

FIG. 2A thus illustrates an example of the evolution of the electrical resistivity $\rho_{a|r}$ of a base compound made of $VO_{1.8}$ (not containing nitrogen) as a function of the temperature $T_r$ for a duration $\Delta t_r$ equal to go min. The electrical resistivity $\rho_{a|r}$ thus remains constant and equal to approximately 10 Ω·cm up to the temperature $T_r$ of approximately 280° C. It then exhibits a strong decrease, in particular between 300° C. and 325° C.

It moreover appears that the evolution of the value of the temperature coefficient of resistance (TCR) as a function of the temperature $T_r$ does not seem to be correlated with that of the electrical resistivity when the degradation of the electrical resistivity is linked to the thermal exposure to $T_r$ for $\Delta t_r$.

Figure 2B:
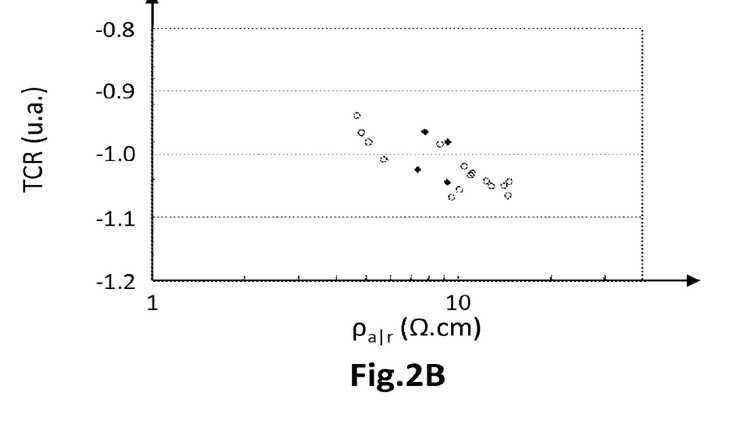

FIG. 2B thus illustrates the values of various measurements of the TCR coefficient (in arbitrary units) of a base compound made of $VO_X$, the electrical resistivity of which is between 5 Ω·cm and 15 Ω·cm, as a function of the electrical resistivity $\rho_{a|r}$ after annealing at 310° C. for a duration $\Delta t_r$ of 90 min (solid diamonds). Values of the TCR coefficient for this same type of $VO_X$ base compound without annealing at the temperature $T_r$ are also indicated (hollow circles). It appears that the TCR coefficient of such a $VO_X$ base compound remains substantially constant, this being the case whether or not the base compound has been subjected to thermal exposure at a high temperature $T_r$ of 310° C.

On the other hand, it appears that the 1/f noise associated with this type of $VO_X$ base compound exhibits an increase that is correlated with the reduction in the electrical resistivity $\rho_{a|r}$ when this is due to the thermal exposure to the temperature $T_r$ for the duration $\Delta t_r$.

Figure 2C:
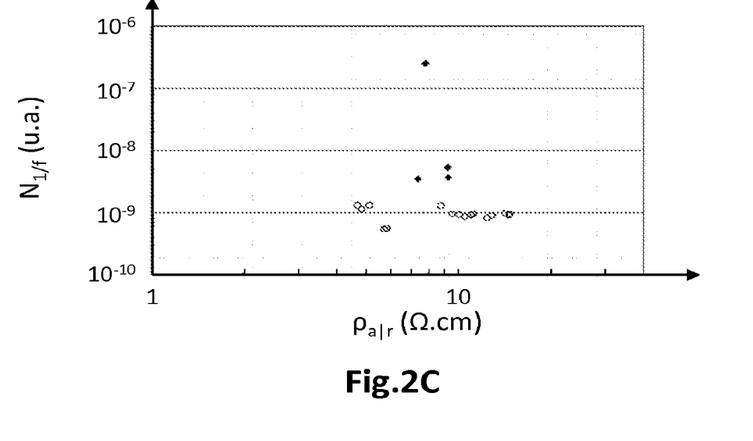

FIG. 2C thus illustrates the values of various measurements of a parameter $N_{1/f}$ representative of the 1/f noise of the $VO_X$ base compounds of FIG. 2B as a function of the electrical resistivity $\rho_{a|r}$ after annealing at 310° C. for a duration $\Delta t_r$ of 90 min (solid diamonds). Values of this 1/f noise parameter for these $VO_X$ base compounds without annealing at the temperature $T_r$ are also indicated (hollow circles). While the 1/f noise remains substantially constant regardless of the value of the electrical resistivity for these $VO_X$ base compounds without annealing at $T_r$, it appears that annealing the $VO_X$ base compounds at a temperature of 310° C. for 90 min causes a significant increase in 1/f noise.

The parameter $N_{1/f}$ representative of the 1/f noise is estimated here from the spectral analysis of a reference electric current flowing in the sensitive material. To this end, the sensitive material is biased with a direct (DC) voltage source set so as to dissipate the reference current into the sensitive material. A very low noise voltage source is also used so as not to bias the measurement of the noise of the sensitive material. The reference current is thus marred by the only noise current of the sensitive material. This current is then amplified by a transimpedance amplifier that delivers a voltage output signal that is the image of the input current.

The voltage signal is sampled, digitized and processed digitally (Fourier transform) in order to obtain its spectrum. The amplitude of the 1/f noise may be obtained by reading a particular point of the spectrum, for example at 1 Hz, or using a least squares calculation method on the low-frequency part of the spectrum where the manifestation of the 1/f noise is the most pronounced.

It therefore appears that exposing an amorphous $VO_x$ base compound having a native electrical resistivity $\rho_a$ at ambient temperature of between 1 Ω·cm and 30 Ω·cm (that is to say non-stoichiometric form) to a temperature $T_r$ for a duration $\Delta t_r$ such that its electrical resistivity $\rho_{a|r}$ drops with respect to its native value $\rho_a$ also causes a degradation of the 1/f noise, without the TCR coefficient otherwise being affected.

This increase in the 1/f noise of such a $VO_x$ base compound may be the result of the onset of crystallization of the compound, in which distinct crystalline phases appear, which differ from one another in terms of the amount of oxygen, these crystalline phases then being stoichiometric forms. Thus, by way of example, the at least partial crystallization of an initially amorphous $VO_x$ base compound, where x is of the order of 1.8, results in the appearance of various stoichiometric crystalline phases, including $VO_2$ and $V_2O_5$ (that is to say x=2.5). The increase in 1/f noise could thus be linked to the appearance of several stoichiometric crystalline phases, differing from one another in terms of the amount of oxygen, and therefore in terms of the loss of the homogeneous character of the chemical composition of the sensitive material, and therefore of its local electrical properties.

Figure 3A:
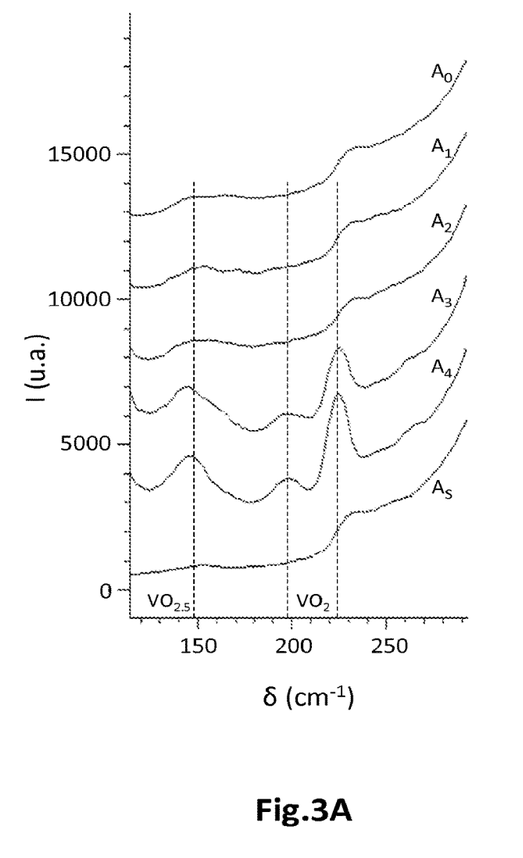
FIGS. 3A and 3B are examples of Raman spectra for $VO_x$ base compounds without thermal exposure, and after thermal exposure for 90 min at various temperatures.
Figure 3B:
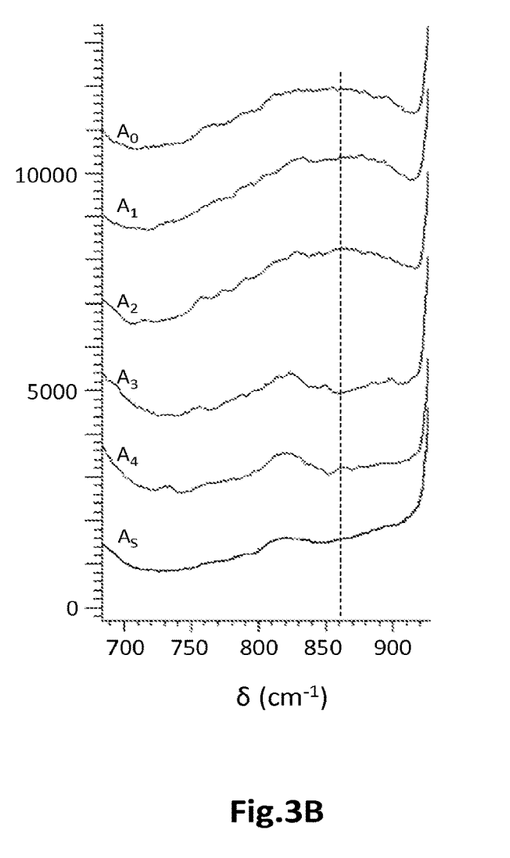

In this respect, FIGS. 3A and 3B illustrate examples of Raman spectra of an initially amorphous $VO_x$ base compound (therefore without nitrogen added), where x is equal to approximately 1.85, for various exposures to a temperature $T_r$ for a duration $\Delta t_r$ of 90 min. The Raman spectra of FIG. 3A are centered on a Raman shift range ranging from approximately 100 to 300 cm$^{-1}$, and those of FIG. 3B are centered on a Raman shift range ranging from approximately 700 to 950 cm$^{-1}$. The curve $A_o$ corresponds to the Raman spectrum of a $VO_{1.85}$ compound without annealing, and the curve $A_o$ corresponds to that of the support on which the compound in question rests. The curves $A_1$, $A_2$, $A_3$ and $A_4$ correspond to the Raman spectrum of the $VO_{1.85}$ compound that has undergone exposure for 90 min to temperatures $T_r$ of 300° C., 310° C., 320° C. and 330° C., respectively. It appears that the peak at 149 cm$^{-1}$ appears and increases in terms of intensity when the temperature $T_r$ increases, this peak being associated with the stoichiometric crystalline phase $V_2O_5$ (x=2.5). Similarly, the peaks at 197 cm$^{-1}$ and 224 cm$^{-1}$ associated with the stoichiometric crystalline phase $VO_2$ appear and increase in terms of intensity with the temperature $T_r$. Correlatively, the peak at 860 cm$^{-1}$ associated with the amorphous character of the base compound decreases as the temperature $T_r$ increases.

It thus appears that the high-temperature exposure of an initially amorphous base compound made from $VO_x$ and not containing any nitrogen, and whose native electrical resistivity is between 1 Ω·cm and 30 Ω·cm, leads to at least partial crystallization of the sensitive material, which results in a drop in its electrical resistivity and in an increase in 1/f noise. In other words, electrical resistivity at ambient temperature is a parameter representative of the amorphous or non-amorphous character of the compound, as well as of 1/f noise. Therefore, by adding a sufficient amount of nitrogen to the base compound as an additional chemical element in order to obtain a modified compound, it is possible to limit the crystallization or even to push back the crystallization threshold of the modified compound, and therefore to limit or even eliminate 1/f noise degradation.

As mentioned above, the manufacturing process then comprises a step of adding nitrogen as an additional chemical element to the base compound, so as to obtain a modified compound. This has a native electrical resistivity substantially equal to that of the base compound. This is between 1 Ω·cm and 30 Ω·cm, which corresponds to a non-stoichiometric amount of oxygen x. The amount of nitrogen to be added to the base compound is thus determined such that the compound thus modified, when exposed to the temperature $T_r$ for the duration $\Delta t_r$ determined beforehand, has an electrical resistivity $\rho_{a|r}$ greater than or equal to its native value. The partial crystallization of the modified compound is thus limited, giving rise to stoichiometric crystalline phases that differ from one another in terms of the amount of oxygen x, and 1/f noise degradation is also limited. The thermal stability of the properties of the sensitive material is thus improved when it is subsequently exposed to the temperature $T_r$ for the duration $\Delta t_r$.

Such a sensitive material is then particularly advantageous in the context of a collective manufacturing process for manufacturing an array of microbolometers of an electromagnetic radiation detection device. Specifically, in a thermal exposure step, the temperature field may exhibit spatial inhomogeneities within a thin-film deposition reactor or an annealing furnace, which may result in a dispersion of the electrical properties of the microbolometers. Thus, by using the sensitive material with a sufficient amount of nitrogen and possibly of boron and/or carbon, the microbolometers exhibit better thermal stability during thermal exposure to the temperature $T_r$, thus reducing the dispersion of the electrical properties of the microbolometers.

Moreover, the sensitive material may also comprise a transition metal belonging to period 4 of the periodic table of the elements, that is to say scandium Sc, titanium Ti, chromium Cr, manganese Mn, iron Fe, cobalt Co, nickel Ni, copper Cu and/or zinc Zn. It may also comprise other chemical elements, for example yttrium Y, niobium Nb, molybdenum Mo, tantalum Ta, tungsten W, inter alia.

Figure 4:
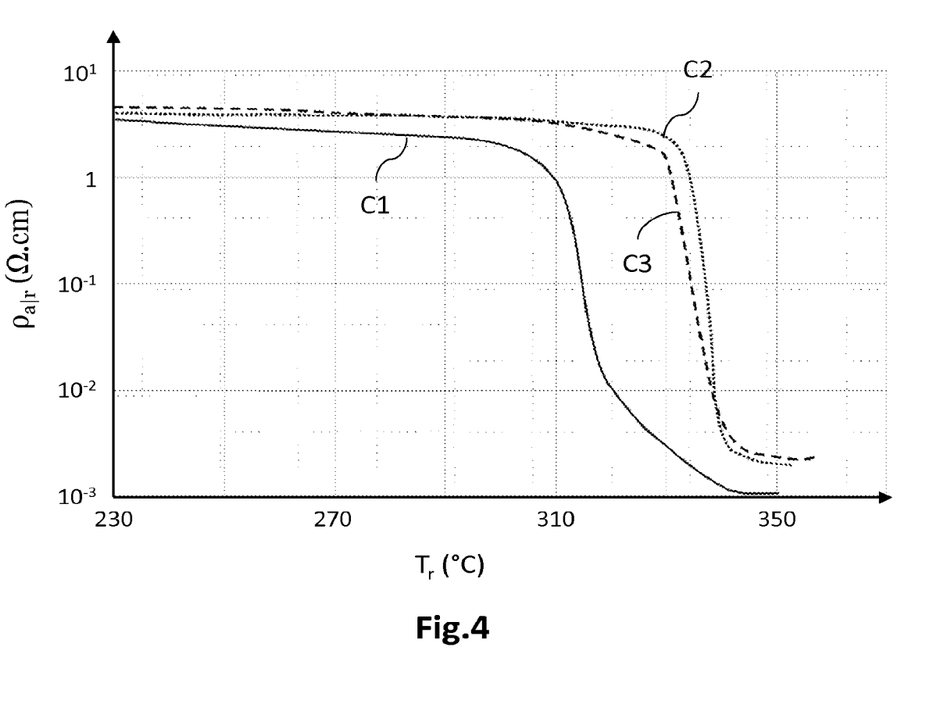
FIG. 4 is a graph illustrating the evolution of the electrical resistivity par at ambient temperature of the sensitive material based on vanadium oxide, after exposure of said material to a temperature $T_r$, for a duration $\Delta t_r$, in the case where the sensitive material comprises, or does not comprise, a sufficient amount of nitrogen.

FIG. 4 illustrates an example of the evolution of the electrical resistivity $\rho_{a|r}$ at ambient temperature of the sensitive material as a function of the thermal exposure temperature $T_r$, for a sufficient amount of added nitrogen. The exposure duration $\Delta t_r$ is equal to 90 min. This example thus demonstrates the increase in the thermal stability range that the sensitive material exhibits when it contains a sufficient amount of nitrogen, that is to say an amount greater than or equal to the effective amount.

Here, the sample of the $VO_x$ sensitive material is obtained using ion beam sputtering (IBS), for example by sputtering a vanadium target under an oxidizing atmosphere at a partial oxygen pressure for example of the order of approximately $10^{-4}$ Torr. The sample of the $VO_xN_w$ sensitive material was obtained by IBS sputtering in an atmosphere comprising nitrogen in addition to oxygen. The amount of oxygen x is equal here to approximately 1.75

The curve C1 corresponds to the evolution of the electrical resistivity $\rho_{a|r}$ of a compound based on $VO_x$, where x=approximately 1.75, not containing nitrogen. It has a native electrical resistivity of the order of approximately 3 to 4 Ω·m. The electrical resistivity $\rho_{a|r}$ becomes less than 50% of its native value starting from the temperature of approximately 310° C. for an exposure of 90 min.

The curve C2 illustrates the evolution of the electrical resistivity $\rho_{a|r}$ as a function of the temperature $T_r$ for a $VO_{1.75}N_w$, sensitive material, where the amount w of nitrogen corresponding to 2.8% at, that is to say the ratio of the number of nitrogen atoms to that of vanadium, is in this case equal to 0.079. It appears that the threshold value $T_{th}$ of the sensitive material, at which the electrical resistivity $\rho_{a|r}$ is at least equal to 50% of the native value $\rho_a$, also increases as the amount w of nitrogen in the sensitive material increases. It thus changes from 310° C. for $VO_{1.75}$ without the addition of nitrogen to approximately 330° C. for $VO_{1.75}N_{0.079}$.

The curve C3 illustrates the evolution of the electrical resistivity $\rho_{a|r}$ as a function of the temperature $T_r$ for a $VO_{1.75}N_w$ sensitive material, where the amount w of nitrogen corresponding to 3.8% at, that is to say the ratio of the number of nitrogen atoms to that of vanadium, is in this case equal to 0.109.

The effective amount of nitrogen such that the sensitive material has at least 50% of its native value after having been exposed to 310° C. for 90 min is thus here 0.079 for x being equal to approximately 1.75. Therefore, in this example, a sensitive material based on vanadium oxide to comprising an amount w of nitrogen equal to at least 0.079 exhibits significant thermal stability allowing it to be exposed to temperatures of up to 330° C. for at most 90 min, while at the same time having its electrical properties preserved, in particular having a limited 1/f noise degradation. For a sensitive material having an amount of oxygen between 1.42 and 1.94, the effective amount of nitrogen here is at least equal to 0.07, for an exposure to approximately 310° C. (to within 5° C.) for 90 min.

The value of the effective amount of nitrogen depends on the exposure temperature $T_r$ and on the exposure duration $\Delta t_r$. A person skilled in the art is then able to determine the value of the effective amount of nitrogen to be added to the compound based on $VO_x$ on the basis of the thermal characteristics $T_r$ and $\Delta t_r$ of the exposure step.

The sensitive material may comprise, in addition to nitrogen, an amount of boron and/or carbon. The amount of additional chemical elements, that is to say the amount of nitrogen and that of boron and/or carbon, is determined such that the sensitive material 15 has an electrical resistivity $\rho_{a/r}$ at ambient temperature at least equal to 50% of the native value $\rho_a$.

A $VO_xWB_y$ sensitive material containing, in addition to nitrogen, an amount of boron may be produced by implanting boron in a $VO_xN_w$ material produced beforehand by IBS sputtering in an oxidizing atmosphere containing nitrogen. The same applies in the case of adding carbon to the $VO_xN_w$ compound. Other techniques for producing the $VO_xN_w$ sensitive material with the addition of boron and/or carbon may be used.

It appears that the sensitive material based on $VO_xN_w$ with a sufficient amount of nitrogen and possibly of boron and/or carbon exhibits a relative variation in the electrical resistivity $\rho_{a|r}$ as a function of the temperature $T_r$ that is particularly low when the thermal exposure temperature is less than or equal to its threshold value $T_{th}$. This then makes it possible to limit the dispersion of electrical properties of the microbolometers resulting from any spatial inhomogeneities in the temperature field within the deposition reactor or the annealing furnace.

Thus, one aspect of the invention relates to a process for manufacturing at least one microbolometer 10, and advantageously, to a collective manufacturing process for manufacturing an array of bolometers 10 of a detection device 1.

The manufacturing process comprises at least one step in which the sensitive material 15 of the microbolometers 10 is subjected to a temperature $T_r$ for the duration $\Delta t_r$.

The values of the temperature $T_r$ and of the duration $\Delta t_r$ are determined such that the base compound of the sensitive material 15 (therefore without the additional chemical element) has an electrical resistivity $\rho_{a|r}$ at least less than 50% of its native value $\rho_a$. These are in particular the temperature and the duration to which the sensitive material will subsequently be subjected in the subsequent steps of manufacturing the microbolometer.

The manufacturing process then comprises a preliminary step of determining the effective value of the amount of at least one additional chemical element, specifically nitrogen and possibly, in addition to nitrogen, of boron and/or carbon, starting from which the sensitive material 15, having undergone exposure to the temperature $T_r$ for the duration $\Delta t_r$, has an electrical resistivity $\rho_{a|r}$ at ambient temperature at least equal to 50% of its native value $\rho_a$.

In a step of producing the absorbent membrane, the sensitive material 15 is deposited in a thin layer on the support layer 20, which rests on a sacrificial layer. It comprises a sufficient amount of nitrogen, and possibly of boron and/or carbon, that is to say an amount greater than or equal to the determined effective value. It may have a thickness of the order of a few ten to a few hundred nanometers, for example between 10 nm and 500 nm, for example equal to 80 nm.

The sensitive material 15 may be obtained by IBS sputtering under an atmosphere containing nitrogen, and possibly by ion implantation of boron and/or carbon. The temperature may be the ambient temperature. The atmosphere is oxidizing when the thin layer of $VO_x$ is produced and the partial oxygen pressure may be of the order of approximately $10^{-5}$ to $10^{-4}$ Torr, for example equal to $6.10^{-5}$ Torr, depending on the desired native value of the electrical resistivity of the sensitive material. The value of the partial oxygen pressure and the content of nitrogen in the atmosphere, or else the content of boron and/or carbon, may be obtained from calibration curves obtained beforehand. Other production techniques may be used, such as atomic layer deposition (ALD), or the deposition of the sensitive material through reactive cathodic sputtering with a metal or vanadium oxide target, possibly followed by implantation of boron and/or carbon.

It is then possible to cover the $VO_xN_w$ compound with the protective layer of silicon nitride, with a thickness for example of 10 nm deposited by PECVD. Boron and/or carbon may then possibly be added by performing several successive implantations. Thus, for a thin layer of the $VO_xN_w$ compound with a thickness of 80 nm covered with the SiN protective layer with a thickness of 10 nm, three successive implantations of boron may be carried out, starting from doses of the order of $10^{16}$ at/cm$^2$ and for implantation energies of the order of around ten to a few tens of KeV. Other techniques for producing the sensitive material may be used, or even other variants of the abovementioned deposition techniques. Thus, for the addition of carbon, it is possible to sputter a target containing only vanadium, under an oxidizing atmosphere containing nitrogen and CO or $CO_2$.

The manufacturing process then comprises at least one step in which the sensitive material is exposed to a temperature greater than the ambient temperature, and less than or equal to $T_r$ for a duration less than or equal to $\Delta t_r$. The exposure temperature may be equal to $T_r$ and be between 300° C. and 400° C., and the duration may be equal to $\Delta t_r$ and be of the order of a few minutes to a few hours. This thermal exposure step may be carried out under an inert atmosphere or under vacuum.

This may thus involve depositing the protective thin layer 22 of silicon nitride through PECVD, depositing at least one of the thin layers forming the encapsulation structure that defines the hermetic cavity, eliminating the sacrificial layer or sacrificial layers used to produce the suspended membrane or the encapsulation structure, or even activating a getter material arranged in said hermetic cavity.

Particular embodiments have just been described. Various modifications and variants will be apparent to a person skilled in the art.

The invention claimed is:

1. A process for manufacturing at least one microbolometer comprising a sensitive material for at least limiting noise degradation of said sensitive material, said sensitive material being formed of a first compound based on vanadium oxide and at least nitrogen as additional chemical element, the process comprising the following steps:
   producing the sensitive material in a thin layer;
   exposing the sensitive material to a temperature $T_r$ greater than the ambient temperature, for a duration $\Delta t_r$, after the step of producing the sensitive material, the temperature $T_r$ and the duration $\Delta t_r$ being such that said first compound, being amorphous and having a native electrical resistivity value at ambient temperature of between 1 Ω·cm and 30 Ω·cm, having undergone a step of exposure to the temperature $T_r$ for the duration $\Delta t_r$, has an electrical resistivity at ambient temperature less than 50% of its native value;
   determining a non-zero effective amount of the additional chemical element added to said first compound, thus forming a modified compound, starting from which the modified compound, having undergone a step of exposure to the temperature $T_r$ for the duration $\Delta t_r$, has an electrical resistivity $\rho_{a|r}$ at ambient temperature greater than or equal to 50% of its native value $\rho_a$;
   in said step of producing the sensitive material in a thin layer, forming the thin layer of said modified compound having an amount of the additional chemical element greater than or equal to the effective amount determined beforehand, the sensitive material being amorphous, having a native electrical resistivity value $\rho_a$ at ambient temperature of between 1 Ω·cm and 30 Ω·cm, and a homogeneous chemical composition; and
   following said step of exposing the sensitive material to the temperature $T_r$ for the duration $\Delta t_r$, said sensitive material then has a noise whose degradation has been at least limited.

2. The manufacturing process as claimed in claim 1, wherein the step of exposing the sensitive material comprises a step of depositing a protective layer covering the sensitive material.

3. The manufacturing process as claimed in claim 1, wherein the step of exposing the sensitive material comprises a step of depositing an encapsulation layer transparent to electromagnetic radiation to be detected and intended to define a cavity in which the microbolometer is located.

4. The manufacturing process as claimed in claim 1, wherein the temperature $T_r$ is greater than or equal to 280° C.

5. The manufacturing process as claimed in claim 1, wherein the duration $\Delta t_r$ is greater than or equal to 90 min.

6. The manufacturing process as claimed in claim 1, wherein the sensitive material is produced at a temperature less than the temperature $T_r$.

7. The manufacturing process as claimed in claim 1, wherein the temperature $T_r$ is equal to 310° C., to within 5° C.

8. A microbolometer comprising a sensitive material made of a first compound based on vanadium oxide and at least nitrogen as additional chemical element, wherein the sensitive material:
- is amorphous,
- has an electrical resistivity at ambient temperature of between 1 Ω·cm and 30 Ω·cm,
- has been exposed, after deposition, to a temperature $T_r$ greater than or equal to 280° C. for a duration $\Delta t_r$ greater than or equal to 90 min,
- a homogeneous chemical composition, and
- an amount of nitrogen, defined as a ratio of the number of nitrogen atoms to that of vanadium, at least equal to 0.070.

9. The microbolometer as claimed in claim 8, wherein an amount of oxygen, defined as a ratio of a number of oxygen atoms to that of vanadium, is between 1.42 and 1.94, to within plus or minus 0.05.

10. The microbolometer as claimed in claim 8, wherein the sensitive material is covered by a protective layer of silicon nitride.

11. A device for detecting electromagnetic radiation, comprising an array of microbolometers as claimed in claim 8, the microbolometers being arranged in at least one hermetic cavity delimited by an encapsulation structure transparent to electromagnetic radiation to be detected, the encapsulation structure comprising at least one layer made of amorphous silicon.

12. The detection device as claimed in claim 11, comprising a getter material located in the hermetic cavity.

* * * * *